United States Patent [19]
Rader

[11] Patent Number: 4,846,220
[45] Date of Patent: Jul. 11, 1989

[54] MEDICATOR WITH READILY CHANGEABLE ORIFICE SIZE

[75] Inventor: Helmut Rader, McLean, Va.

[73] Assignee: Animedics, Inc., McLean, Va.

[21] Appl. No.: 616,683

[22] Filed: Jun. 4, 1984

[51] Int. Cl.$^4$ ............................................. E03B 7/07
[52] U.S. Cl. ................................. 137/564.5; 251/206
[58] Field of Search ..................... 137/564.5; 251/206, 251/207, 319

[56] References Cited

U.S. PATENT DOCUMENTS

| | | | |
|---|---|---|---|
| 562,410 | 6/1896 | Moon | 251/206 |
| 1,679,219 | 7/1928 | Huff | 251/206 |
| 2,310,051 | 2/1943 | Baer | 137/564.5 |
| 2,323,618 | 7/1943 | Ottoson | 137/564.5 |
| 2,618,510 | 11/1952 | Mills | 137/564.5 |
| 2,780,232 | 2/1957 | Ney | 251/206 |
| 2,788,244 | 4/1957 | Gilmour | 251/206 |
| 2,828,146 | 3/1958 | Abbey | 251/319 |
| 3,084,712 | 4/1963 | Brown | 137/564.5 |
| 3,144,238 | 8/1964 | Williams | 251/206 |
| 3,166,096 | 1/1965 | Lang | 137/564.5 |
| 3,342,420 | 9/1967 | Roulet et al. | 251/206 |
| 4,210,175 | 7/1980 | Daniels et al. | 137/564.5 |

FOREIGN PATENT DOCUMENTS

2453512  9/1976  Fed. Rep. of Germany ... 137/564.5

Primary Examiner—John Rivell
Attorney, Agent, or Firm—Nixon & Vanderhye

[57] ABSTRACT

The invention relates to a liquid flow control apparatus that is particularly useful for adding a small amount of a first liquid per unit volume to a flow of a second liquid. One particular application is for medicators for adding a medicant to a water supply for farm animals. The invention allows the size of an orifice—which produces limited flow of water supply, and a pressure drop—to be changed in such a manner that flow of water need not be stopped nor need any parts of the apparatus be disassembled. Preferably a slide is mounted in a block to which flow pipe parts are connected, the slide having at least four differently sized orifices formed therein. O-ring seals disposed in contact with the slide in an interior cavity of the block, and surrounding connections of the pipe parts to the block, prevent leakage of flowing liquid. Also, a detent is provided for detenting the slide into each position in which an orifice is in alignment with the flow pipe parts. The block and slide may be mounted directly on top of a medicator receptacle, which is interiorly divided by a flexible membrane.

11 Claims, 1 Drawing Sheet

MEDICATOR WITH READILY CHANGEABLE ORIFICE SIZE

BACKGROUND AND SUMMARY OF THE INVENTION

The invention relates to a liquid flow control apparatus, and particularly for use with an apparatus for adding a small amount of a first liquid (such as a medicant) per unit volume to a flow of a second liquid (such as a water supply for farm animals). A proven device for accurately adding desired amounts of medicant to the flow of water is shown in U.S. Pat. No. 3,084,712. This device includes a receptacle which is interiorly divided by a flexible membrane having first and second sides, with a first liquid—medicant—in contact with the second side of the membrane. An inlet conduit is operatively connected to the receptacle on the first side of the membrane, and an outlet conduit is operatively connected from the receptacle on a second side of the membrane. A pipe for containing the flow of water has a first part thereof operatively connected to the inlet conduit, and a second part thereof operatively connected to the outlet conduit. In order to provide for proper proportioning of the medicant into the flow of water, means are provided for producing limited flow and a differential pressure between the first and second pipe parts. Such means take the form of a disc having an orifice therein, the disc mounted at the junction between the first and second pipe parts. Flow conditions can be changed by stopping the flow of water, disassembling components of the apparatus, and replacing the disc with another disc having a differently sized orifice therein.

While the medicating apparatus as described in U.S. Pat. No. 3,084,712 works well, it is inconvenient and time consuming to stop the water flow, disassemble components of the apparatus, and the like in order to change the orifice size. According to the present invention, this problem is overcome by providing a mechanism that allows the orifice size to be changed quickly and easily. According to the invention, the orifice size may be changed without stopping the flow of the second liquid, or without disassembling any parts of the apparatus.

The flow control apparatus according to the invention comprises a block having first and second generally parallel faces, with the pipe first part extending generally perpendicular to the first face, and the pipe second part extending generally perpendicular to the block second face and generally in alignment with the pipe first part. An internal cavity of the block defines a guide, and the cavity is in fluid communication with the pipe first and second parts. A slide is received within the guide for slideable movement with respect thereto in a dimension generally parallel to said first and second block faces. Means defining a plurality of differently sized orifices in said slide are also provided, each orifice extending through the slide in a dimension generally parallel to the pipe first and second parts. The slide is mounted so that upon sliding movement thereof different orifices will come into alignment with the pipe first and second parts. Sealing means are associated with said block and slide to confine liquid flow therethrough from the pipe first part, through the orifice of the slide in alignment with the pipe parts, and out the pipe second part.

The block is preferably mounted directly to a top surface of the receptacle, and preferably the block is of a plastic material and is segmented, having an internal cavity, with the segments ultrasonically welded together. The sealing means preferably is provided by an O-ring associated with each of the block segments, and preferably detents are provided for holding the slide into each position wherein an orifice is in alignment with the pipe parts.

It is the primary object of the present invention to provide an apparatus for adding a small amount of a first liquid per unit volume to the flow of a second liquid, and allowing the pressure differential producing orifice size to be changed quickly and easily, and without disassembly of any apparatus components. This and other objects of the invention will become clear from an inspection of the detailed description of the invention, and from the appended claims.

DETAILED DESCRIPTION OF THE INVENTION

Figure 1:
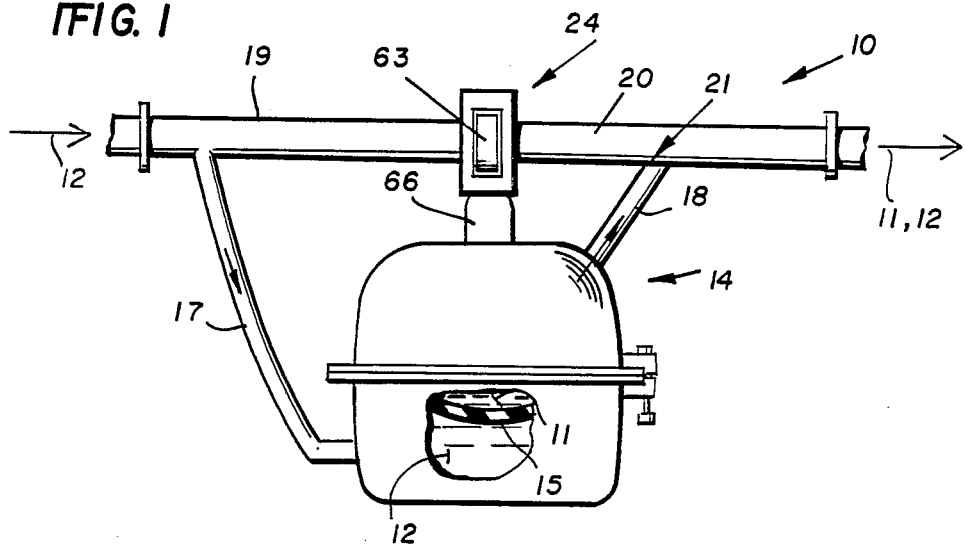
FIG. 1 is a side view of an exemplary medicator apparatus according to the present invention.

The apparatus 10 of FIG. 1 is for adding a small amount of a first liquid 11—such as a medicant—per unit volume to a flow of a second liquid 12—such as water. The apparatus 10 is particularly useful as a medicator for medicating the water supply for farm animals, although it has many other uses, essentially being utilizable whenever a small amount of one liquid needs to be added to a flow of another liquid.

The apparatus 10 comprises a receptacle 14 having the interior thereof divided by a flexible membrane 15 having first and second sides. On one side of the membrane 15 is the first liquid 11, while on the other side of the membrane 15 is the second liquid 12. The receptacle 14 and membrane 15 may take any of the forms such as illustrated in U.S. Pat. No. 3,084,712, the disclosure of which is hereby incorporated by reference herein, or they may take the form illustrated in U.S. Pat. No. Des. 264,994.

An inlet conduit 17 is operatively connected to the receptacle 14 on a first side of the membrane 15, while an outlet conduit 18 is operatively connected to the receptacle 14 on the second side of the membrane 15, opposite the first side. A pipe is provided for controlling the flow of the second liquid, the pipe comprising first part 19 operatively connected in fluid communication to the inlet conduit 17, and a second part 20 operatively connected in fluid communication with the outlet conduit 18. Preferably an orifice, or like device, is provided at the connection of the outlet conduit 18 to the second pipe part 20 as illustrated schematically by reference numeral 21 in FIG. 1 and as described in more detail in said U.S. Pat. No. 3,084,712.

According to the present invention, a means is provided for producing limited flow and a pressure differential between the pipe parts 19 and 20. According to the present invention such means comprises means defining a plurality of orifices of different sizes, and means for mounting the orifices for movement with respect to the pipe parts 19, 20 so that the orifice size can be changed without disassembling any parts of the apparatus 10, or without stopping the flow of the second liquid 12. Such means are shown generally be reference numeral 24 in the drawings.

Figure 2:
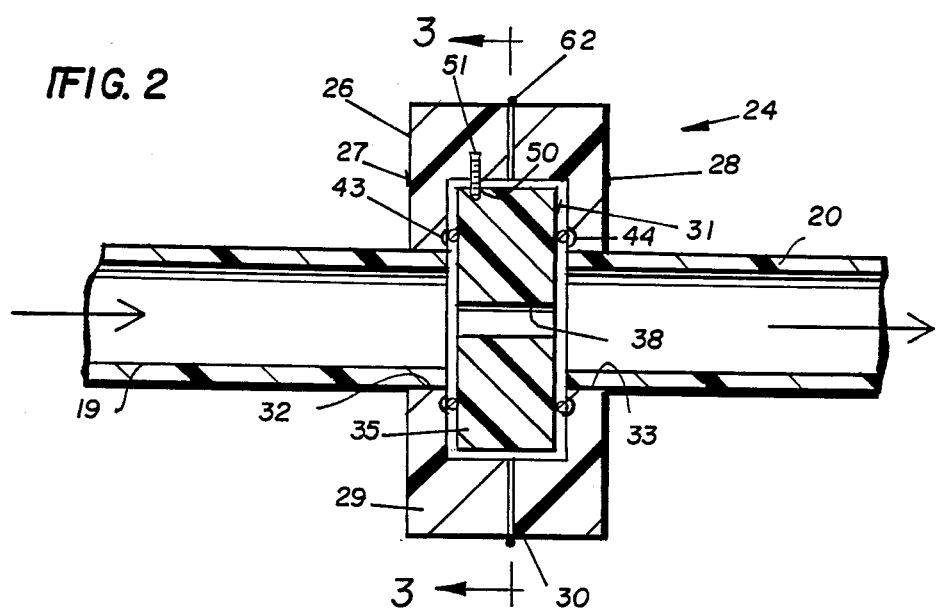
FIG. 2 is a cross-sectional view taken along lines 2—2 of FIG. 3 illustrating the orifice size changing mechanism according to the present invention.
Figure 3:
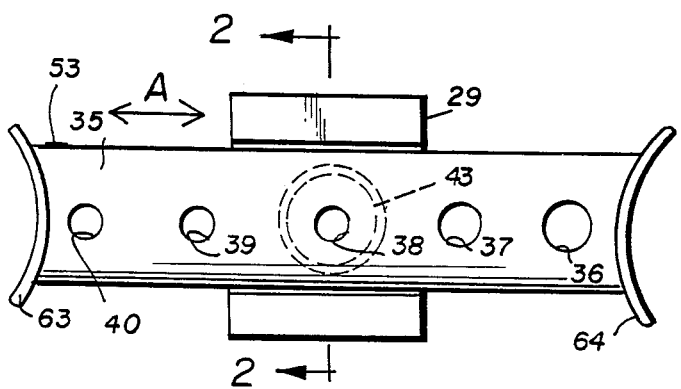
FIG. 3 is an elevational view of the apparatus of FIG. 2 taken along lines 3—3 thereof.
Figure 4:
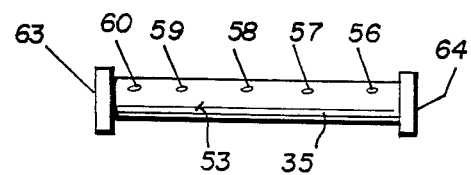
FIG. 4 is a top plan view of the slide illustrated in FIGS. 2 and 3.

The means 24 are illustrated most clearly in FIGS. 2 through 4. Means 24 preferably comprise a block 26 having a first face 27 and a second face 28 generally parallel to the first face. Preferably the block is formed of a plastic material, such as ABS, and is segmented (that is formed in two halves), a first segment 29 and a second segment 30. The segments 29, 30 define an interior cavity 31 which defines a guide, and is in fluid communication with the pipe parts 19, 20.

First pipe part 19 is connected to the block 26 so that it extends generally perpendicularly to the first face 27, and the second pipe part 20 is connected so that is extends generally perpendicularly to the second face 28. The pipes 19, 20 can be connected to the block 26 in any convenient manner, such as the threaded interengagement illustrated schematically at reference numerals 32 and 33 in FIG. 2.

Mounted for slideable movement within the internal cavity 31 of block 36 is a slide 35. The slide 35 also preferably is formed of a plastic material, such as ABS, and it has cross-sectional dimensions which are just slightly less than the cross-sectional dimensions of the internal cavity 31. The slide 35 has means defining a plurality of differently sized orifices 36–40 therein. Five such orifices are illustrated in FIG. 3, but of course any number may be provided although it is preferred that at least four such orifices be provided. Each orifice extends completely through the slide 35 in a dimension parallel to the aligned pipe parts 19, 20, as seen most clearly in FIG. 2. It is noted that the orifices 36–40 illustrated in the drawings are not to scale, but are enlarged for clarity of illustration. Typically the orifices will be quite a bit smaller than illustrated in the drawings.

Sealing means are also part of the apparatus 24. The sealing means are associated with the block 26 and the slide 35 to confine the flow therethrough from the inlet pipe part 19, through a single orifice 36–40 which is in alignment with the pipe parts 19 and 20, and then through the pipe part 20 so that there is no leakage of liquid at the block 26. One desirable form that the sealing means can take is a pair of O-rings 43, 44 (see FIG. 2). The O-rings are embedded in the block segments 29, 30 (e.g. received within annular recesses therein), and surround the ends of the pipe parts 19, 20 where they interface with the cavity 31. Of course the diameters of the O-rings 43, 44 will be larger than the diameters of the pipe parts 19, 20 and larger than the diameters of any orifice 36–40. The O-rings 43, 44 are of conventional elastomeric material, and allow sliding movement of the slide 35 in dimension A (see FIG. 3), which dimension is generally parallel to the faces 27, 38, and generally perpendicular to the direction of flow of the water through the pipe parts 19, 20.

In order to be sure that a selected orifice 36–40 is in proper alignment with the pipe parts 19, 20, it is desirable to provide detent means. Detent means provide a detenting action such that as each orifice 36–40 is moved into alignment with the pipe parts 19, 20, it is arrested in that position, and the operator knows that the desired alignment has occurred. One form that such detent means may take is the provision of a plunger 50 (see FIG. 2) which is pressed by a spring 51 into engagement with the top surface 53 of the slide 35. In the top surface 53 of the slide 35 are provided a plurality of recesses 56–60, one disposed above and in operative association with each of the orifices 36–40. For instance the recess 56 is just above the orifice 36, the recess 57 just above the orifice 37, etc.

In order to facilitate movement of the slide 35, preferably an integral handle 63, 64 is provided at each end thereof.

Preferably the apparatus 24 is mounted to a top portion of the receptacle 14, such as by the mounting bracket 66.

In the construction of the apparatus 24, after the segments 29, 30 are formed, the O-rings 43, 44 are properly placed into operative association with recesses in the cavity-defining portions thereof, and the plunger 50 and spring 51 are properly put into place. Then the slide 35 is placed in the cavity 31, making sure that there is proper interengagement between the plunger 50 and the top surface 53 of the slide 35, and the two segments 29, 30 are moved together in face-to-face relationship (as illustrated in FIG. 2) and an ultrasonic weld 62 is formed holding the segments 29, 30 together.

In a typical operation of the apparatus 10, the flow of water is started to the pipe part 19, part of the flow passing through inlet conduit 17 to the first side (i.e. bottom) of the membrane 15. This applies pressure, comparable to the flow pressure, to the liquid 11, and forces part of the liquid 11 through the outlet conduit 18, and orifice 21, into the flow pipe part 20 wherein it is entrained with the flow of the liquid 12.

The desired pressure drop and flow control for the liquid 12 is provided by grasping one of the handles 63, 64 and moving the desired orifice 36–40 into alignment with the pipe parts 19, 20, the detent plunger 50 engaging the appropriate recess 56–60. For instance, as illustrated in FIG. 3, if it is known that the orifice 38 will provide the desired flow and pressure drop conditions, the slide 35 is moved until the plunger 50 is pressed into the recess 58. The liquid 12 then flows through the pipe 19, through the orifice 38, and into the pipe 20. When it is desired to change the orifice 36–40, for whatever reason, it is not necessary to disassemble any parts or to stop the flow of the liquid 12. Rather one merely grasps one of the handles 63, 64 of the slide 35, and moves it in dimension A until the desired other orifice is in alignment with the pipe parts 19, 20.

It will thus be seen that according to the present invention a simple yet effective liquid flow control apparatus has been provided which allows the flow control orifice to be changed quickly and easily. While the invention has been herein shown and described in what is presently conceived to be the most practical and preferred embodiment thereof, it will be obvious to those of ordinary skill in the art that many modifications may be made thereof within the scope of the invention, which scope is to be accorded the broadest interpretation of the appended claims so as to encompass all equivalent structures and devices.

What is claimed is:

1. Apparatus for adding a small amount of a first liquid per unit volume to a flow of a second liquid, comprising: a receptacle interiorly divided by a flexible membrane having first and second sides, with the first liquid adapted to be disposed in conect with the second side of the membrane; and inlet conduit operatively connected to the receptacle on the first side of the membrane; an outlet conduit operatively connected to the receptacle on the second side of the membrane opposite the first side; a pipe for containing the flow of the second liquid, a first part of the pipe operatively connected to said inlet conduit, and a second part of the pipe operatively connected to said outlet conduit; and means for producing limited flow of the second liquid, and a pressure differential between the pipe first and second parts; said means for producing limited flow and a pressure differential comprising:

- means defining a plurality of orifices of different size, and means for mounting said orifices for manual movement with respect to said pipes so that the size of orifice can be changed without stopping the flow of the second liquid, or without disassembling any parts of the apparatus;
- a block having first and second generally parallel faces, said pipe first part extending generally perpendicular to said first face, and said pipe second part extending generally perpendicular to said block second face and generally in alignment with said pipe first part, said block physically operatively mounted to said receptacle;
- an internal cavity of said block defining a guide, and said cavity in fluid communication with said pipe first and second parts;
- a manual slide received within said guide for slideable movement with respect thereto in a dimension generally parallel to said first and second block faces and having a slide handle at at least one end thereof;
- means defining a plurality of differently sized orifices in said slide, each orifice extending through said slide in a dimension generally parallel to the pipe first and second parts;
- said slide mounted so that upon sliding movement thereof different orifices will come into alignment with said pipe first and second parts; and
- sealing means associated with said block and slide to confine liquid flow therethrough from the pipe first part, through the orifice of the slide in alignment with the pipe parts, and out the pipe second part; and
- wherein said block is of plastic material, and is segmented, being divided into segments along a plane generally parallel to said block faces, and generally bisecting said cavity.

2. Apparatus as recited in claim 1 further comprising an orifice provided at the connection of said outlet conduit to said pipe second part.

3. Apparatus as recited in claim 1 wherein said block is mounted on the top surface of said receptacle.

4. Apparatus as recited in claim 1 further comprising an ultrasonic weld around said block periphery connecting said block segments together in fluid tight relationship, said ultrasonic weld comprising the sole means for connecting said parts together.

5. Apparatus as recited in claim 1 wherein said sealing means comprises an O-ring received by each of said block segments and surrounding the region of the pipe part extending into the cavity associated with each block segment.

6. Apparatus as recited in claim 1 wherein said sealing means comprises at least one O-ring mounted within said block cavity.

7. Apparatus as recited in claim 6 further comprising detent means associated with said slide and said block for providing a detenting action holding said slide in each position wherein an orifice in said slide is in alignment with said pipe parts.

8. Apparatus as recited in claim 1 wherein each of said pipe parts is threaded into engagement with its respective block face.

9. Apparatus as recited in claim 1 further comprising detent means for providing a detenting action holding each of a plurality of orifices in operative alignment with said pipe.

10. Apparatus as recited in claim 1 wherein said means defining a plurality of orifices in said slide defines at least four orifices in said slide.

11. Apparatus as recited in claim 1 wherein said block segments are sealed together in fluid tight relationship and are connected together so that no connecting components extend in said internal cavity.

* * * * *